United States Patent
Stancalie et al.

(10) Patent No.: US 12,509,013 B2
(45) Date of Patent: Dec. 30, 2025

(54) METHOD FOR DETECTING IMPACT AND ACTIVATING OCCUPANT PROTECTION DEVICES

(71) Applicant: Continental Automotive Technologies GmbH, Hannover (DE)

(72) Inventors: Laurentiu Stancalie, Timisoara (RO); Gabriel-Cosmin Stoican, Sanandrei (RO)

(73) Assignee: Continental Automotive Technologies GmbH, Frankfurt am Main (DE)

( * ) Notice: Subject to any disclaimer, the term of this patent is extended or adjusted under 35 U.S.C. 154(b) by 183 days.

(21) Appl. No.: 18/578,873

(22) PCT Filed: Jun. 27, 2022

(86) PCT No.: PCT/EP2022/067564
§ 371 (c)(1),
(2) Date: Jan. 12, 2024

(87) PCT Pub. No.: WO2023/285123
PCT Pub. Date: Jan. 19, 2023

(65) Prior Publication Data
US 2024/0317169 A1  Sep. 26, 2024

(30) Foreign Application Priority Data

Jul. 16, 2021 (EP) .................... 21465538
Jul. 19, 2021 (DE) ............ 10 2021 207 647.5

(51) Int. Cl.
*G05D 1/00* (2024.01)
*B60R 21/0132* (2006.01)
*B60R 21/0134* (2006.01)

(52) U.S. Cl.
CPC ...... *B60R 21/0134* (2013.01); *B60R 21/0133* (2014.12); *B60R 2021/01322* (2013.01)

(58) Field of Classification Search
CPC .. G05D 1/0248; G05D 1/0038; G05D 1/0055; G05D 1/0088; G05D 1/0212;
(Continued)

(56) References Cited

U.S. PATENT DOCUMENTS

| 5,014,810 A | 5/1991 | Mattes et al. |
| 2003/0100983 A1 | 5/2003 | Bullinger et al. |

(Continued)

FOREIGN PATENT DOCUMENTS

| DE | 19729960 A1 | 11/1998 |
| DE | 19938891 A1 | 2/2001 |

(Continued)

OTHER PUBLICATIONS

Korean Office Action dated Mar. 21, 2025 corresponding to Korean Patent Application No. 10-2023-7041526.
(Continued)

*Primary Examiner* — Yuen Wong

(57) ABSTRACT

A method for detecting impact and activating occupant protection devices, in which at least one acceleration signal from at least one acceleration sensor is compared with a triggering threshold. In this case, at least one environmental sensor for detecting an imminent impact and for determining at least one parameter of this imminent impact, in particular an expected time of impact and severity of impact, is provided. The triggering behavior is adapted on the basis of the parameters of the environmental sensor.

5 Claims, 2 Drawing Sheets

(58) Field of Classification Search
CPC .. G05D 1/0219; G05D 1/0231; G05D 1/0238; G05D 1/0278; G05D 2105/89; G05D 2107/90; G05D 2109/10; G05D 2111/10; G05D 1/243; G05D 1/246; G05D 1/248; G05D 1/689; B25J 11/0085; B25J 5/00; G06N 20/00; B62D 57/032
See application file for complete search history.

(56) References Cited

U.S. PATENT DOCUMENTS

2016/0152208 A1    6/2016  Ewert et al.
2019/0154530 A1*   5/2019  Lang ................. G01L 5/0052

FOREIGN PATENT DOCUMENTS

| DE | 10108849 A1 | 10/2001 |
| DE | 102008011680 A1 | 9/2009 |
| DE | 102013212092 A1 | 1/2015 |
| DE | 102017220910 A1 | 5/2019 |
| EP | 0728624 A2 | 8/1996 |
| WO | 0230716 A1 | 4/2002 |

OTHER PUBLICATIONS

Search Report dated Mar. 1, 2022 from corresponding German patent application No. 10 2021 207 647.5.
International Search Report and Written Opinion dated Oct. 17, 2022 from corresponding International patent application No. PCT/EP2022/067564.

* cited by examiner

METHOD FOR DETECTING IMPACT AND ACTIVATING OCCUPANT PROTECTION DEVICES

CROSS-REFERENCE TO RELATED APPLICATIONS

The present application is a National Stage Application under 35 U.S.C. 371 of International Patent Application No. PCT/EP2022/067564 filed on Jun. 27, 2022, which claims priority from German Patent Application No. 102021207647.5 filed on Jul. 19, 2021, in the German Patent and Trade Mark Office and European Patent Application No. 21465538.3 filed in the European Patent Office on Jul. 16, 2021, the disclosures of which are herein incorporated by reference in their entireties.

BACKGROUND

1. Field

Methods and apparatuses consistent with embodiments of the present application relate to detecting impact and activating occupant protection devices.

2. Description of Related Art

A method for detecting impact, in particular for motor vehicles, and for activating occupant protection devices is known from DE 197 29 960, in which an acceleration signal from an acceleration sensor is measured. The acceleration signal directly or a signal derived therefrom such as, for example, the integrated acceleration signal is then compared with a triggering threshold which can be adjusted. At least one so-called pre-crash sensor is provided for this method, which registers the change in the relative speed and/or the relative distance of collision objects within the vicinity of the vehicle surroundings. In the event that the pre-crash sensor detects a safety-critical state such as an imminent impact, the triggering threshold for activating occupant protection devices is reduced. In addition to radar and camera sensors, lidar or ultrasonic sensors or a fusion of the data from multiple such sensors are, in this case, also possible as so-called pre-crash sensors.

Likewise, an apparatus for controlling occupant protection devices can be inferred from EP 0728624 A2 in which, in addition to acceleration sensors for determining an impact value, environmental sensors are also provided in order to adapt the triggering behavior on the basis of the environmental sensors.

Furthermore, whilst it is true that the actual triggering takes place on the basis of an impact value which is functionally related to the impact acceleration and which is compared with a triggering threshold value, the triggering threshold value is, however, varied on the basis of information from the environmental sensor, in particular the relative speed, angle of incidence and time, a severe impact is extrapolated in particular at high relative speed, and the triggering threshold is reduced in order to make possible an early triggering.

However, in this case, it has proven to be disadvantageous that the lowering of the triggering threshold for acceleration sensors in the event of an imminent impact can lead to the occupant restraint device being triggered too early if the lowered acceleration triggering threshold is already exceeded in the period of time prior to the impact. This can happen, e.g., if the ground is uneven or a curb is driven over immediately in front of the actual obstacle captured by the proximity sensor or if there are corresponding disturbances at the beginning of an accident, but in particular also in the case of so-called non-triggering cases, that is to say crash events of lesser severity which do not yet actually require the triggering of these restraint means.

Therefore, WO 2002/30716 A1 provides a method for activating occupant protection devices, in which an approach speed to a collision object is determined within a specified vicinity of the vehicle surroundings and, in the event that the approach speed lies above a predefined threshold value, a probable time of impact with the collision object is defined, and a time range starting from the probable time of impact is defined, during which the allocated occupant protection devices are already activated after a plausibility check.

In this case, however, the determination of the time range of the plausibility check is adapted on the basis of a signal quality of at least one proximity sensor, the driving dynamics and collision object geometry and, in addition to the plausibility check, an acceleration signal or a signal equivalent hereto is checked to determine whether it lies above a predefined threshold and, in terms of the algebraic sign, is consistent with the impact direction established by the at least one proximity sensor. It is true that the signal quality of the proximity sensor is considered by this approach, but there is nevertheless still the risk, due to the fixed plausibility check, that occupant protection devices are also triggered by lower-speed collisions, possibly in combination with other vibrations or disturbances and, as a result, the driver is massively affected, although the severity of the impact does not actually justify this.

SUMMARY

Aspects and objects of embodiments of the present application increase safety in road traffic.

Aspects and objects of embodiments of the present application adapt the triggering threshold in a procedure which is virtually the inverse of the previous reduction of the triggering threshold.

Thus, it is provided that a starting time for the algorithm and the threshold adaptation is set to the expected time of impact if at least one parameter of the environmental sensor satisfies a specified condition. That is to say, the environmental sensor can and will already derive this starting time prior to the occurrence thereof from the known trajectory considerations and effectively be able to wake up the algorithm.

As of this starting time, the triggering threshold is, however, increased even more, starting from a starting value, if the acceleration signal or the signal derived therefrom satisfies a minimum condition. That is to say, if the acceleration signal or the signal derived therefrom rises above the minimum condition, the triggering threshold also increases at the same time. If, however, at the starting time, the acceleration signal or the signal derived therefrom is still below the minimum condition, the triggering threshold initially remains at the starting value and does not rise until the minimum condition is satisfied, so that a false triggering is nevertheless avoided in the event of the triggering time being incorrectly established. However, the minimum condition is significantly lower than the starting value for the triggering threshold, and the acceleration signal or the signal derived therefrom is therefore not by any means sufficient to also exceed the starting value at the same time as the minimum condition. Rather, even in the case of triggering cases, there is always first a phase in which the triggering threshold is already increased as well.

Due to the early starting time and the immediate adaption of the triggering threshold when the minimum condition is satisfied, the safety margin between typical non-triggering processes and the triggering threshold can be increased and the algorithm can be made more robust against disturbances and false triggering occurrences. Real triggering cases will nevertheless exceed the triggering threshold within the specified time, possibly even slightly earlier due to the starting time set by the environmental sensor. However, with the targeted increase, the aim is not to trigger earlier, but rather to distinguish more reliably between triggering and non-triggering cases.

The acceleration signal or the signal derived therefrom preferably exceeds a minimum threshold as the minimum condition for increasing the triggering threshold.

However, there is preferably an upper limit for the triggering threshold. The triggering threshold is only continually increased from the starting value until such time as a specified maximum value of the triggering threshold has been reached. In this case, the acceleration signal or the signal derived therefrom must, in addition, in principle satisfy the minimum condition.

In order to have safety in the overall concept, including in the event of the environmental sensor failing or in the event that the signal quality is not sufficient or the conditions for the parameters for setting the starting time are not reached, that time at which the acceleration signal or the signal derived therefrom exceeds a specified threshold is also alternatively used as the starting time, if no starting time was previously set by the environmental sensor.

In a further configuration which is described in more detail below in the figures, the increase in terms of the rise thereof is, in addition, adapted again, namely in that the triggering threshold is increased with a first rise as long as the acceleration signal or the signal derived therefrom satisfies a minimum condition and, in addition, is still below a second condition. Once the second condition has been exceeded, the triggering threshold is increased with a second rise which is higher compared to the first. As a result, the triggering threshold is generally even better adapted to the typical signal courses at the beginning of the various non-triggering cases. Thanks to this adaptation, the safety margin reached by the early starting time and the increase in the triggering threshold is also maintained in the second time range which is, itself, particularly critical, in which time range non-triggering cases in the acceleration signal or the signal derived therefrom can definitely also assume considerable amplitudes, in particular if, additionally, disturbances on the roadway, e.g., curb hits, etc., of course also influence and increase the signal as well.

The method is implemented in an algorithm of a control unit for detecting impact and activating occupant protection devices for a motor vehicle and is, to this end, stored in the memory thereof.

BRIEF DESCRIPTION OF THE DRAWINGS

The application is explained in more detail below on the basis of exemplary embodiments with reference to the figures.

DETAILED DESCRIPTION

Figure 1:
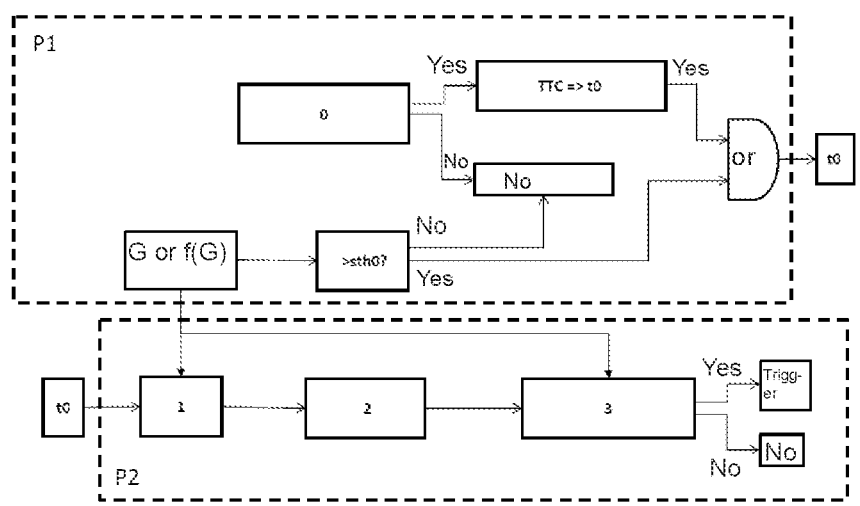
FIG. 1 is a flow diagram illustrating a method of controlling an occupant protection device, according to an embodiment.
Figure 2:
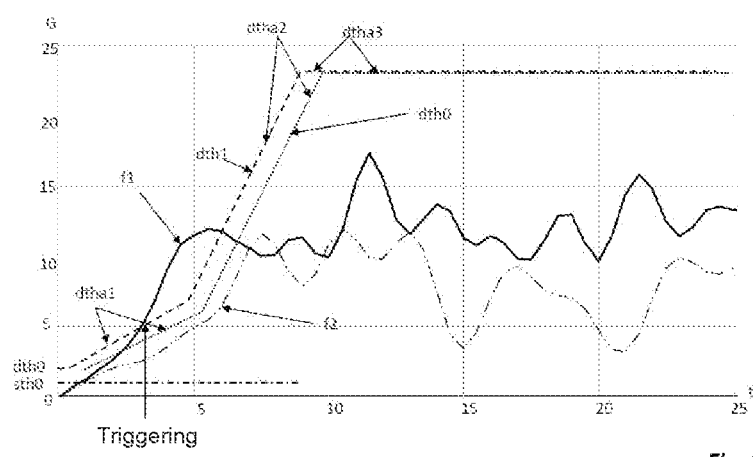
FIG. 2 is a chart illustrating the triggering of an occupant protection device, according to an embodiment.

In this case, FIG. 1 outlines the functional process in the algorithm of the control unit on the basis of a flowchart, whilst FIG. 2 attempts to illustrate this on the basis of the signals.

In this case, phase P1 outlines the process prior to the start of the actual triggering algorithm at starting time T0 and phase P2 outlines the process following starting time T0.

In this case, function block 0 outlines the environmental sensor and the evaluation of the signals from this environmental sensor, in particular the derivation of an expected time of impact TTC as well as, if necessary, further specified parameters such as, for example, the evaluation of the expected collision object with regard to its type, the severity of the expected impact and the signal or decision quality, that is to say also the probability of occurrence. If the specified conditions for the signals from, or parameters of, the environmental sensor are met, the starting time (t0) is set to the expected time of impact (TTC).

Moreover, FIG. 1 also outlines, in the function block marked ">sth0?" the preferably second, alternative path for activating the actual triggering algorithm, in which namely the acceleration signal (G) or the signal (f(G)) derived therefrom is compared with a specified starting threshold (sth0) and, in the event that this is exceeded, the actual triggering algorithm is likewise activated.

The two alternatives, that is to say the setting of the starting time by the environmental sensor or by the acceleration sensor are functional alternatives, that is to say they are to be understood to be a logical OR link. If the two indicated options are not satisfied, the actual triggering algorithm is not yet activated (No). Accordingly, the microprocessor can still be operated in power-saving mode and parts of the algorithm can be left inactive.

By contrast, as of the starting time t0, the actual triggering algorithm becomes active and the triggering threshold (dth1 or dth0) is now also increased, starting from a starting value (dth0) in function block 2, if it has also been ascertained in function block 1 that the acceleration signal or the signal derived therefrom satisfies at least one minimum condition and the specified maximum value (dth3) of the triggering threshold has not yet been reached.

Finally, in function block 3, the actual triggering decision is now made by a comparison with the triggering threshold which is thus adaptively adjusted, and when the triggering threshold is correspondingly exceeded by the acceleration signal or the signal derived therefrom, at least specific individual or all of the occupant protection devices are triggered, wherein the allocation of the occupant protection devices to be triggered and, of course, further parameters such as, for example, the detected direction of the impact and the detected severity can be adapted even further.

FIG. 2 now outlines, purely by way of example, the signal course of a triggering case as function F1 (solid line shape) and non-triggering cases, some of which are difficult to distinguish at the beginning of the collision, as function F2 (line shape -**-).

In this case, the course of the triggering threshold, depicted with dth0 as a dotted line, is shown for that case in which the actual triggering algorithm is only activated on the basis of the acceleration signal or of the signal derived therefrom and the exceeding of the starting threshold sth0. In this respect, this line only starts when this threshold sth0 is exceeded.

The course of the triggering threshold, drawn with dth1 and depicted as a dashed line, is shown for the case in which the starting time T0 has already previously been set to the expected collision time by the environmental sensor and the actual triggering algorithm is already activated when this starting time occurs.

If the acceleration signal is not supposed to have reached the minimum condition yet for the increase at this starting time, the triggering threshold dth1 still remains at the starting value as well for such a short time span. However, since the minimum condition for the increase can be set relatively low, the increase dtha1 for dth1 begins earlier and, as a result, the triggering threshold dth1, in particular, reaches a greater safety distance compared to the outlined dash-dot-dot-dash (-**-) signal course of the non-triggering case.

It should again be stressed that the triggering time (fire) which is slightly displaced backwards in time between the two characteristic curves dth0 and dth1 is less decisive than the higher safety distance for the non-triggering cases, which is reached by the early algorithm start, effectively the parallel displacement of the regions with the rises dtha1 and dtha2.

In order to, functionally, be able to set an even better demarcation between triggering and non-triggering cases, an adaptation of the rise dtha1 to dtha2 of the triggering threshold value is also provided in this preferred configuration.

That is to say that the triggering threshold is increased with a first rise dtha1 as long as the acceleration signal or the signal derived therefrom satisfies a minimum condition and, in addition, is below a second condition, whilst the triggering threshold is increased with a second rise dtha2 which is higher compared to the first in the event of the second condition being exceeded. As a result, the triggering threshold can be adapted with even more precision between the defined cases and the safety against false triggering occurrences can be further increased.

It should be pointed out that the precise values and courses of the characteristic curve are only to be understood to be examples and can be adapted to the respective individual case of the respective vehicle and the crash behavior thereof, but also the manufacturer's specifications.

The invention claimed is:

1. A method of controlling an occupant protection device of a vehicle, the method comprising:
   receiving an acceleration signal from at least one acceleration sensor configured to sense an acceleration of the vehicle;
   determining an imminent impact protection between the vehicle and an object based on a parameter of the impact detected by an environmental sensor; and
   triggering action of the occupant protection device based on the parameter, wherein as of a starting time (t0), a triggering threshold (dth1=dth0+fth (G,t)) is increased fth (G,t), starting from a starting value (dth0), when the acceleration signal or a signal derived therefrom satisfies a minimum condition, wherein the starting time (t0) is set to an expected time of impact (TTC) when at least one parameter of the environmental sensor satisfies a specified condition.

2. The method according to claim 1, wherein the triggering threshold (dth1) is continually increased from the starting value as long as the acceleration signal satisfies the minimum condition or until a specified maximum value (dth3) of the triggering threshold has been reached.

3. The method according to claim 2, wherein the acceleration signal exceeds a minimum threshold for the minimum condition, the triggering threshold is increased until the specified maximum value (dth3) of the triggering threshold has been reached.

4. The method according to claim 3, wherein when the acceleration signal or the signal derived therefrom exceeds a specified threshold (sth0), the starting time is used, if when no starting time was previously set by the environmental sensor.

5. The method according to claim 4, wherein the triggering threshold is increased with a first rise as long as the acceleration signal or the signal derived therefrom satisfies the minimum condition and is, in addition, below a second condition, whilst the triggering threshold is increased with a second rise which is higher compared to the first in an event of the second condition being exceeded.

* * * * *